(12) United States Patent
Frost et al.

(10) Patent No.: US 6,582,499 B2
(45) Date of Patent: Jun. 24, 2003

(54) FLUID SEPARATION ASSEMBLY

(75) Inventors: Chester B. Frost, Corvallis, OR (US); Brett R. Krueger, Lebanon, OR (US)

(73) Assignee: ATI Properties, Inc., Albany, OR (US)

( * ) Notice: Subject to any disclaimer, the term of this patent is extended or adjusted under 35 U.S.C. 154(b) by 0 days.

(21) Appl. No.: 10/243,018

(22) Filed: Sep. 13, 2002

(65) Prior Publication Data

US 2003/0033933 A1 Feb. 20, 2003

Related U.S. Application Data

(63) Continuation of application No. 09/422,505, filed on Oct. 21, 1999, now abandoned.
(60) Provisional application No. 60/107,784, filed on Nov. 10, 1998.

(51) Int. Cl.[7] .......................... B01D 53/22; B01D 63/08
(52) U.S. Cl. ..................... 96/7; 95/56; 96/11; 55/524; 210/321.75
(58) Field of Search ............... 95/55, 56; 96/4, 96/7, 9, 11; 210/321.75, 321.84

(56) References Cited

U.S. PATENT DOCUMENTS

| | | | | | |
|---|---|---|---|---|---|
| 2,824,620 A | * | 2/1958 | DeRosset | ...................... | 95/56 |
| 3,206,198 A | * | 9/1965 | Rubin | ........................ | 473/98 |
| 3,336,730 A | * | 8/1967 | McBride et al. | ............... | 95/56 |
| 3,344,586 A | * | 10/1967 | Langley et al. | .................. | 96/7 |
| 3,350,176 A | * | 10/1967 | Green et al. | ................ | 422/109 |
| 3,368,329 A | * | 2/1968 | Eguchi et al. | ................... | 96/8 |
| 3,398,834 A | * | 8/1968 | Nuttall et al. | .......... | 210/321.84 |
| 3,428,476 A | * | 2/1969 | Langley et al. | ............. | 427/229 |
| 3,439,474 A | * | 4/1969 | McKinley | ..................... | 95/56 |
| 3,447,288 A | * | 6/1969 | Juda et al. | ..................... | 96/11 |
| 3,450,500 A | * | 6/1969 | Setzer et al. | ................. | 423/653 |
| 3,469,944 A | * | 9/1969 | Bocard et al. | .............. | 423/650 |
| 3,486,301 A | * | 12/1969 | Bonnett | ........................... | 96/7 |

(List continued on next page.)

FOREIGN PATENT DOCUMENTS

| | | | | |
|---|---|---|---|---|
| CA | 0724479 | * | 12/1965 | ................. 95/55 |
| CA | 1238866 | * | 7/1988 | |
| DE | 2005494 | * | 9/1970 | ................. 95/56 |
| EP | 1065741 | * | 1/2001 | |
| GB | 2233579 | * | 1/1991 | ................... 96/9 |
| JP | 45-2642 | * | 1/1970 | |
| JP | 45-14404 | * | 5/1970 | |
| JP | 1-145302 | * | 6/1989 | |
| JP | 1-145303 | * | 6/1989 | |
| JP | 1-262903 | * | 10/1989 | |
| JP | 6-134244 | * | 5/1994 | |
| WO | WO 97/43796 | * | 11/1997 | |
| WO | WO 99/30806 | * | 6/1999 | |

OTHER PUBLICATIONS

English abstract of Japanese Patent No. 1–262903, 1989.*
English abstract of Japanese Patent No. 432150, 1992.*
English abstract of Japanese Patent No. 513230, 1993.*
English abstract of Japanese Patent No. 514790, 1993.*
English abstract of Japanese Patent No. 604070, 1994.*
English abstract of Japanese Patent No. 634540, 1994.*
English abstract of Japanese Patent No. 710910, 1995. □□.*
English abstract of Japanese Patent No. 11116202, 1999.*
Edlund, David J. et al., "The Practical Use of Metal–Membrane Reactors for Industrial Applications", The 1995 Membrane Technology Reviews, pp. 89–97 (Nov., 1994).*

(List continued on next page.)

Primary Examiner—Robert H. Spitzer
(74) Attorney, Agent, or Firm—Patrick J. Viccaro

(57) ABSTRACT

A fluid separation assembly having a fluid permeable membrane and a wire mesh membrane adjacent the fluid permeable membrane, wherein the wire mesh membrane supports the fluid permeable membrane and is coated with an intermetallic diffusion barrier. The barrier may be a thin film containing at least one of a nitride, oxide, boride, silicide, carbide and aluminide. Several fluid separation assemblies can be used in a module to separate hydrogen from a gas mixture containing hydrogen.

28 Claims, 9 Drawing Sheets

U.S. PATENT DOCUMENTS

| | | | | |
|---|---|---|---|---|
| 3,520,803 A | * | 7/1970 | Iaconelli | 210/640 |
| 3,564,819 A | * | 2/1971 | Neulander et al. | 96/7 |
| 3,665,680 A | * | 5/1972 | Heuser | 96/10 |
| 3,713,270 A | * | 1/1973 | Farr et al. | 95/56 |
| 3,761,382 A | * | 9/1973 | Hammond et al. | 204/266 |
| 3,837,146 A | * | 9/1974 | Faure et al. | 55/158 |
| 3,881,891 A | * | 5/1975 | Goltsov et al. | 95/56 |
| 3,881,897 A | * | 5/1975 | Faure et al. | 55/158 |
| 3,972,695 A | * | 8/1976 | Buckley et al. | 96/10 |
| 4,003,725 A | * | 1/1977 | Bunn et al. | 96/8 |
| 4,056,373 A | * | 11/1977 | Rubin | 96/10 |
| 4,132,668 A | * | 1/1979 | Gryaznov et al. | 502/4 |
| 4,238,403 A | * | 12/1980 | Pinto | 518/704 |
| 4,239,728 A | * | 12/1980 | Stenberg et al. | 422/46 |
| 4,243,536 A | * | 1/1981 | Prolss | 210/321.84 |
| 4,248,688 A | * | 2/1981 | Gartner et al. | 204/192.34 |
| 4,254,086 A | * | 3/1981 | Sanders | 422/187 |
| 4,319,923 A | * | 3/1982 | Falanga et al. | 75/384 |
| 4,331,520 A | * | 5/1982 | Juda et al. | 75/718 |
| 4,422,911 A | * | 12/1983 | Juda et al. | 205/576 |
| 4,468,235 A | * | 8/1984 | Hill | 95/46 |
| 4,472,176 A | * | 9/1984 | Rubin | 95/56 |
| 4,589,891 A | * | 5/1986 | Iniotakis et al. | |
| 4,597,868 A | * | 7/1986 | Watanabe | 210/232 |
| 4,613,436 A | * | 9/1986 | Wight et al. | 210/232 |
| 4,655,797 A | * | 4/1987 | Iniotakis et al. | |
| 4,699,637 A | * | 10/1987 | Iniotakis et al. | 55/158 |
| 4,713,234 A | * | 12/1987 | Weirich et al. | |
| 4,810,485 A | * | 3/1989 | Marianowski et al. | |
| 4,849,187 A | * | 7/1989 | Uozu et al. | |
| 4,981,676 A | * | 1/1991 | Minet et al. | |
| 4,999,107 A | * | 3/1991 | Guerif | 210/224 |
| 5,126,045 A | * | 6/1992 | Kohlheb et al. | 210/321.85 |
| 5,139,541 A | * | 8/1992 | Edlund | |
| 5,158,581 A | * | 10/1992 | Coplan | |
| 5,205,841 A | * | 4/1993 | Vaiman | |
| 5,215,729 A | * | 6/1993 | Buxbaum | |
| 5,217,506 A | * | 6/1993 | Edlund et al. | 95/56 |
| 5,225,080 A | * | 7/1993 | Karbachsch et al. | 210/321.75 |
| 5,229,102 A | * | 7/1993 | Minet et al. | |
| 5,259,870 A | * | 11/1993 | Edlund | 95/56 |
| 5,269,917 A | * | 12/1993 | Stankowski | 210/232 |
| 5,326,550 A | * | 7/1994 | Adris et al. | |
| 5,354,547 A | * | 10/1994 | Rao et al. | |
| 5,376,167 A | * | 12/1994 | Broutin et al. | |
| 5,393,325 A | * | 2/1995 | Edlund | 95/56 |
| 5,449,848 A | * | 9/1995 | Itoh | |
| 5,486,475 A | * | 1/1996 | Kramer et al. | 435/266 |
| 5,498,278 A | * | 3/1996 | Edlund | 96/11 |
| 5,500,122 A | * | 3/1996 | Schwartz | |
| 5,518,530 A | * | 5/1996 | Sakai et al. | |
| 5,520,807 A | * | 5/1996 | Myrna et al. | |
| 5,525,322 A | * | 6/1996 | Willms | |
| 5,536,405 A | * | 7/1996 | Myrna et al. | 210/321.75 |
| 5,639,431 A | * | 6/1997 | Shirasaki et al. | |
| 5,645,626 A | * | 7/1997 | Edlund et al. | 95/56 |
| 5,734,092 A | * | 3/1998 | Wang et al. | |
| 5,738,708 A | * | 4/1998 | Peachey et al. | |
| 5,782,960 A | * | 7/1998 | Ogawa et al. | 96/11 |
| 5,821,185 A | * | 10/1998 | White et al. | |
| 5,858,314 A | * | 1/1999 | Hsu et al. | |
| 5,861,137 A | * | 1/1999 | Edlund | 423/652 |
| 5,888,273 A | * | 3/1999 | Buxbaum | |
| 5,891,222 A | * | 4/1999 | Hilgendorff et al. | 96/7 |
| 5,904,754 A | * | 5/1999 | Juda et al. | |
| 5,938,800 A | * | 8/1999 | Verrill et al. | |
| 5,965,010 A | * | 10/1999 | Bloomfield et al. | 205/163 |
| 5,997,594 A | * | 12/1999 | Edlund et al. | 48/76 |
| 6,103,028 A | * | 8/2000 | Juda et al. | |
| 6,152,995 A | * | 11/2000 | Edlund | |
| 6,171,574 B1 | * | 1/2001 | Juda et al. | |
| 6,221,117 B1 | * | 4/2001 | Edlund et al. | 48/76 |
| 6,238,465 B1 | * | 5/2001 | Juda et al. | |

OTHER PUBLICATIONS

Knapton, A. G., "Palladium Alloys for Hydrogen Diffusion Membranes", Platinum Metals Review, vol. 21, 44–50 (1977).*

Minet, R. G. et al., Experimental Studies of a Ceramic Membrane Reactor for the Steam/Methane Reaction at Moderate Temperatures (400–700oC), Symposium on Natural Gas Upgrading II Presented before The Division of Petroleum Chemistry, Inc., Meeting of Amerian Chemical Society, San Francisco, CA. USA, pp. 245–248 (Apr., 1992).*

Oertel, Michael, et al., "Steam Reforming of Natural Gas with Integrated Hydrogen Separation for Hydrogen Production", Chemical Engineering Technology, vol. 10, pp. 248–255 (1987).*

Shu, J. et al., "Catalytic Palladium–Based Membrane Reactors: A Review", The Canadian Journal of Chemical Engineering, vol. 69, 99. 1036–1060 (Oct. 1991).*

* cited by examiner

FLUID SEPARATION ASSEMBLY

CROSS REFERENCE TO RELATED APPLICATIONS

This application is a Continuation of U.S. patent Ser. No. 09/422,505, filed Oct. 21, 1999, now abandoned, which claims priority under 35 U.S.C. §119(e) to U.S. Provisional Patent Application No. 60/107,784, filed on Nov. 10, 1998.

STATEMENT REGARDING FEDERALLY SPONSORED RESEARCH OR DEVELOPMENT

Not Applicable.

BACKGROUND OF THE INVENTION

1. Field of the Invention

The present invention relates to apparatuses and methods for separation of a desired fluid from a fluid mixture. More particularly, the present invention is generally directed to a fluid separation assembly having a membrane permeable to a desired fluid and a wire mesh membrane support that supports the permeable membrane and has a barrier that prevents intermetallic diffusion bonding.

2. Description of the Invention Background

Generally, when separating a gas from a mixture of gases by diffusion, the gas mixture is typically brought into contact with a nonporous membrane which is selectively permeable to the gas that is desired to be separated from the gas mixture. The desired gas diffuses through the permeable membrane and is separated from the other gas mixture. A pressure differential between opposite sides of the permeable membrane is usually created such that the diffusion process proceeds more effectively, wherein a higher partial pressure of the gas to be separated is maintained on the gas mixture side of the permeable membrane. It is also desireable for the gas mixture and the selectively permeable membrane to be maintained at elevated temperatures to facilitate the separation of the desired gas from the gas mixture. This type of process can be used to separate hydrogen from a gas mixture containing hydrogen. Thus, in this application, the permeable membrane is permeable to hydrogen and is commonly constructed from palladium or a palladium alloy. The exposure to high temperatures and mechanical stresses created by the pressure differential dictates that the permeable membrane be supported in such a way that does not obstruct passage of the desired gas through the membrane.

One type of conventional apparatus used for the separation of hydrogen from a gas mixture employs a woven refractory-type cloth for supporting the permeable membrane during the separation process. The disadvantage of this type of conventional membrane support is that the cloth support is susceptible to failure when it is exposed to high mechanical stresses associated with the differential pressure required to effect diffusion through the membrane material.

Another conventional permeable membrane support is a metal gauze structure placed adjacent to the permeable membrane. The disadvantage of this type of support is that intermetallic diffusion bonding occurs between the membrane support and the permeable membrane when they are exposed to high pressures and high temperatures. The high pressure tends to compress the permeable membrane and the metal gauze together and the high temperatures tend to deteriorate the chemical bonds of those materials. Such undesirable condition results in migration of the molecules of the permeable membrane to the metal gauze membrane and the migration of molecules of the metal gauze membrane to the permeable membrane until a bond is formed between those two structures. This intermetallic diffusion bonding results in a composite material that is no longer permeable by the hydrogen gas.

Thus, the need exists for a method and apparatus for separating a desired fluid from a fluid mixture that can reliably withstand high operating pressures and temperatures.

Another need exists for a permeable membrane and support arrangement for separating a desired fluid from a fluid mixture, wherein the permeable membrane is not susceptible to breakage or intermetallic diffusion bonding.

Yet another need exists for a method of supporting a membrane that is permeable to a fluid, wherein the fluid permeable membrane is exposed to high temperatures and high pressures.

SUMMARY OF THE PRESENT INVENTION

The present invention provides a fluid separation assembly having a fluid permeable membrane and a wire mesh membrane support adjacent the fluid permeable membrane, wherein the wire mesh membrane support has an intermetallic diffusion bonding barrier.

The present invention further provides a method for separating a desired fluid from a fluid mixture comprising a membrane that is permeable by the desired fluid, providing a wire mesh membrane support with an intermetallic diffusion bonding barrier, wherein the wire mesh membrane support is adjacent to the fluid permeable membrane, contacting the fluid permeable membrane support with the fluid mixture and contacting the wire mesh membrane support with the desired fluid permeating the fluid permeable membrane.

The present invention further provides for a method of making a fluid separation assembly comprising providing a membrane permeable to a desired fluid, providing a first retainer, providing a wire mesh membrane support having an intermetallic diffusion bonding barrier and placing it adjacent the fluid permeable membrane, providing a permeate member adjacent the wire mesh membrane support, providing a gasket adjacent the fluid permeable membrane, providing a second retainer adjacent the wire mesh membrane support and joining the first retainer, the gasket and the second retainer at their peripheries.

The present invention provides for a method for supporting a fluid permeable membrane comprising providing a membrane that is permeable by a desired fluid, and providing a wire mesh membrane support with an intermetallic diffusion bonding barrier, wherein the wire mesh membrane support is adjacent and supports the fluid permeable membrane.

Other details, objects and advantages of the present invention will become more apparent with the following description of the present invention.

BRIEF DESCRIPTION OF THE DRAWINGS

For the present invention to be readily understood and practiced, preferred embodiments will be described in conjunction with the following figures wherein.

DETAILED DESCRIPTION OF THE INVENTION

The present invention will be described below in terms of apparatuses and methods for separation of hydrogen from a mixture of gases. It should be noted that describing the present invention in terms of a hydrogen separation assembly is for illustrative purposes and the advantages of the present invention may be realized using other structures and technologies that have a need for such apparatuses and methods for separation of a desired fluid from a fluid mixture containing the desired fluid.

It is to be further understood that the Figures and descriptions of the present invention have been simplified to illustrate elements that are relevant for a clear understanding of the present invention, while eliminating, for purposes of clarity, other elements and/or descriptions thereof found in a hydrogen separation assembly. Those of ordinary skill in the art will recognize that other elements may be desirable in order to implement the present invention. However, because such elements are well known in the art, and because they do not facilitate a better understanding of the present invention, a discussion of such elements is not provided herein.

Figure 1:
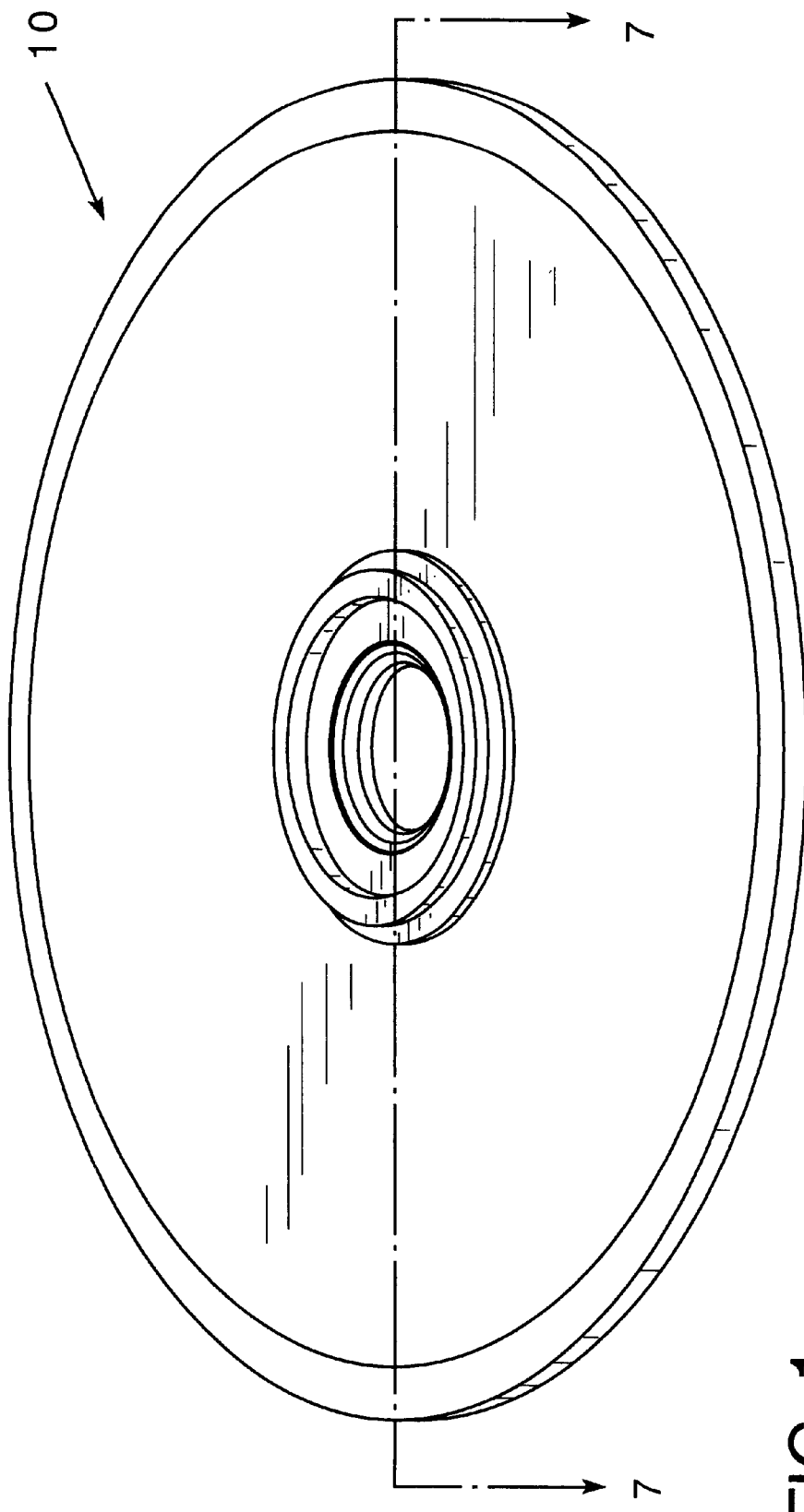
FIG. 1 is a top isometric view of a fluid separation assembly of the present invention.
Figure 2:
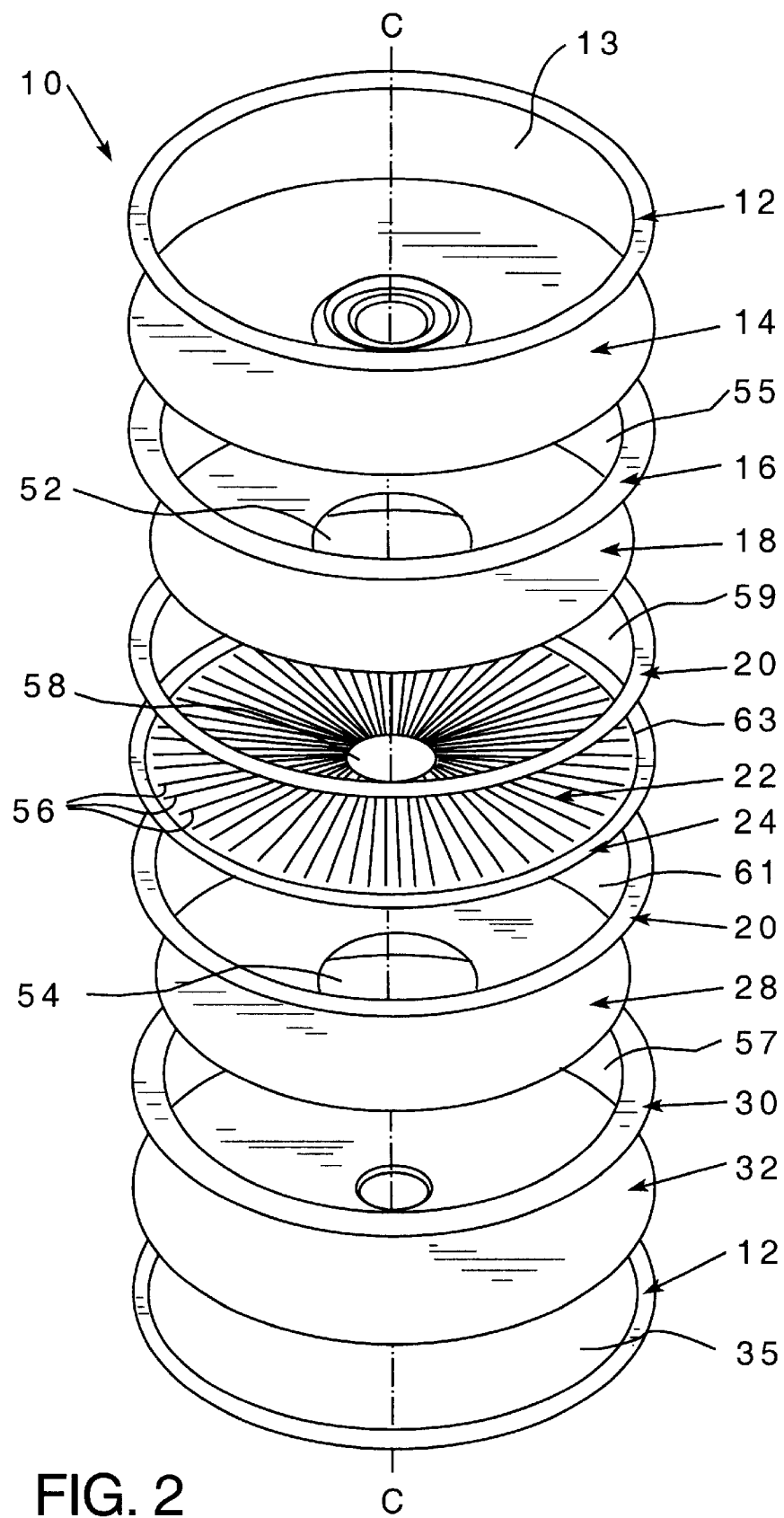
FIG. 2 is an exploded isometric view of the fluid separation assembly of the present invention shown in FIG. 1.

FIGS. 1 and 2 illustrate one embodiment of the fluid separation assembly 10 of the present invention, wherein FIG. 2 is an exploded view of the fluid separation assembly 10 shown in FIG. 1. The fluid separation assembly 10 comprises first membrane retainers 12, a female membrane subassembly 14, a first membrane gasket 16, a first wire mesh membrane support 18, second membrane retainers 20, a slotted permeate plate 22, a permeate rim 24, a second wire mesh membrane support 28, a second membrane gasket 30 and a male membrane subassembly 32. In one embodiment, the first retainers 12 may be substantially flat ring members having an outside diameter equal to the diameter of the female and male membrane subassemblies 14 and 32 and a thickness of between approximately 0.001 inches and 0.060 inches. The first membrane retainers 12 each have a centrally disposed opening 13 and 35. The first membrane retainers 12 may be made from Monel 400 (UNS N 04400); however, other materials that are compatible with the welding process, discussed below, may also be used. It will also be appreciated that while first retainers 12 are shown as comprising substantially annular members they may have other desired shapes and other thicknesses without departing from the spirit and scope of the present invention.

Figure 3:
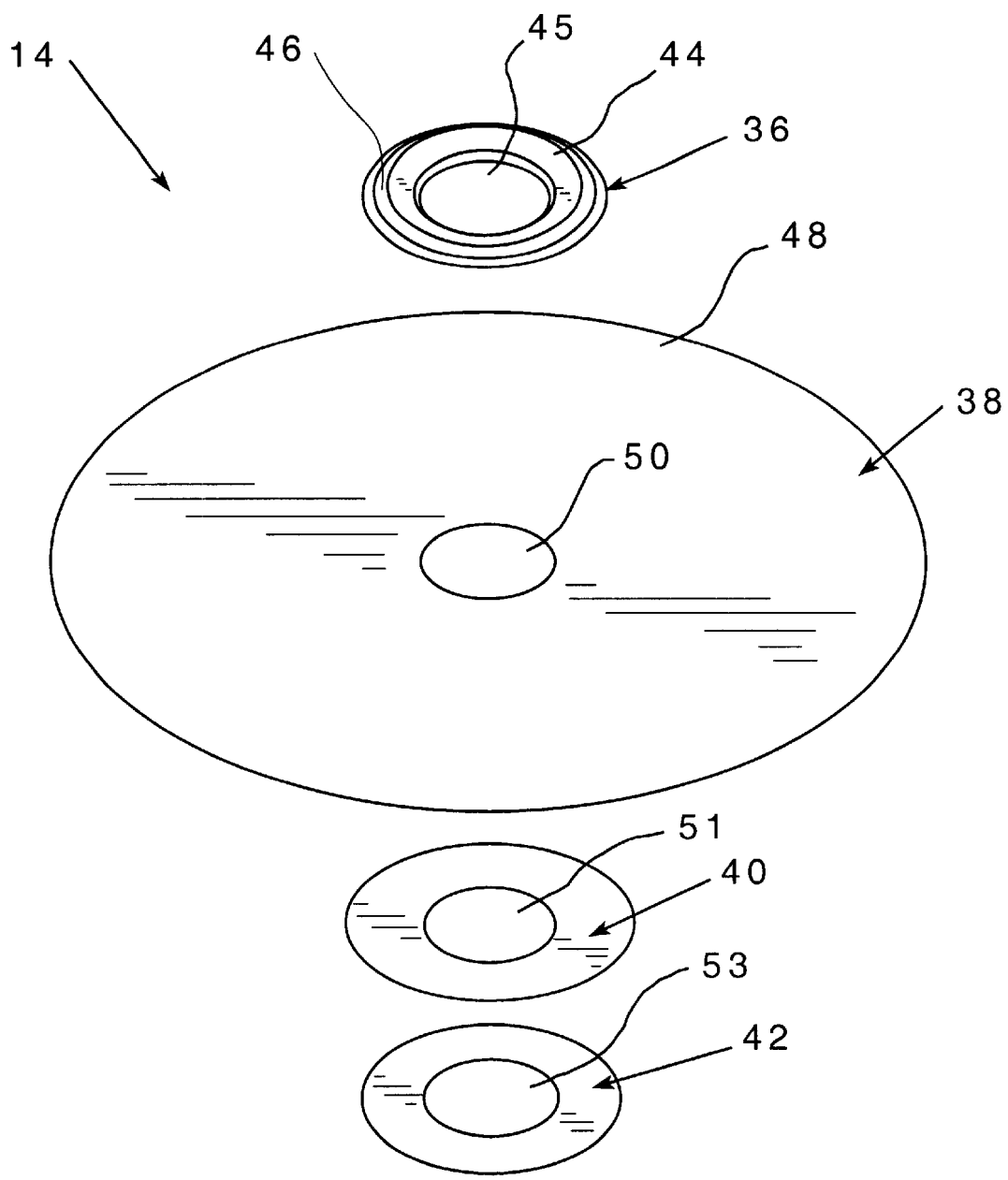
FIG. 3 is an exploded isometric view of the female permeable membrane subassembly of the present invention shown in FIG. 1.

FIG. 3 is an exploded view of a female permeable membrane subassembly 14. In this embodiment, female membrane subassembly 14, comprises a female gasket seat 36, a hydrogen permeable membrane 38, an inner diameter membrane gasket 40 and a center support washer 42. In this embodiment, the female gasket seat 36 is a substantially flat ring member 44 having a raised face 46 extending around the ring member 44 and a centrally disposed opening 45. It will be appreciated that while this embodiment is shown with gasket seats with this configuration, there may be other geometries of gasket seats specific to other gasket configurations or materials that may be used without departing from the spirit and the scope of the present invention. The female gasket seat 36 may be made from Monel 400; however, other materials such as nickel, copper, nickel alloys, copper alloys, or other alloys that provide for compatible fusion with the chosen permeable membrane material during welding may be used. In this embodiment, the hydrogen permeable membrane 38 is a substantially planar member having a circular configuration, opposing sides 48 and a centrally disposed circular opening 50. The inner diameter membrane gasket 40 is also a flat ring member having a centrally disposed opening 51. Also in this embodiment, the inner diameter membrane gasket 40 may be made from Monel 400 (UNS N 04400); however, other materials such as nickel, copper, nickel alloys, copper alloys, or other alloys that provide for compatible fusion with the chosen permeable membrane material during welding may be used. The center support washer 42 is a flat ring member having a centrally disposed opening 53. The center support washer 42 may be made of Monel 400 (UNS N 04400); however, other materials such as nickel, copper, nickel alloys, copper alloys, or other alloys that provide for compatible fusion with the chosen permeable membrane material or alloy during welding may be used.

Referring back to FIG. 2, in this embodiment, the first and second membrane gaskets 16 and 30 are each a substantially flat ring member having a centrally-disposed opening 55 and 57, respectively. In this embodiment, the first and second membrane gaskets 16 and 30 may be made from Monel 400 alloy (UNS N 004400), nickel, copper, nickel alloys, copper alloys or other precious alloys or other alloys compatible with the weld that is used to join the components of the fluid separation assembly 10 and which is discussed below. The first and second membrane gaskets 16 and 30 may have a thickness of between approximately 0.0005 inches to 0.005 inches. However, other gasket thicknesses could be employed.

Also in this embodiment, the first and second wire mesh membrane supports 18 and 28 are planar, ring-shaped members having centrally disposed openings 52 and 54, respectively. The wire mesh membrane supports 18 and 28 may be made from 316L stainless steel alloy with a mesh count of between approximately 19 to 1,000 mesh per inch, wherein the mesh count is chosen to be adequate to support the hydrogen permeable membranes 38 and 62. The style of woven mesh may include a standard plain square weave, twill square weave, rectangular plain or twill weave or triangular plain or twill weave. One example of a mesh count that may be used is 49 mesh per inch. The wire mesh membrane supports 18 and 28 may be made of steel alloys, stainless steel alloys, nickel alloys or copper alloys. The wire mesh may be coated with a thin film that prevents intermetallic diffusion bonding (i.e., an intermetallic diffusion bonding barrier). The intermetallic diffusion bonding barrier may be a thin film containing at least one of an oxide, a nitride, a boride, a silicide, a carbide, or an aluminide and may be applied using a number of conventional methods, including but not limited to, physical vapor deposition (PVD), chemical vapor disposition, and plasma enhanced vapor deposition. For example, the method of reactive sputtering, a form of PVD, can be used to apply a thin oxide film of between approximately 600–700 angstroms to the wire mesh membrane supports 18 and 28. A variety of oxides, nitrides, borides, silicides, carbides and aluminides may also be used for the thin film as well as any thin films that will be apparent to those of ordinary skill in the art. Using this form of PVD results in a dense amorphous thin film having approximately the same mechanical strength as the bulk thin film material.

Also in this embodiment, the second membrane retainers 20 each are a substantially flat ring member. One retainer 20 has a centrally disposed opening 59 and retainer 20 has a centrally disposed opening 61. See FIG. 2. These retainers 20 may be the same thickness as the first and second wire mesh membrane supports 18 and 28. The second membrane retainers 20 may be made from a material that is compatible with the weld, discussed below, such as Monel 400 (UNS N 004400) and nickel, copper, nickel alloys, copper alloys, precious metals or alloys, or other alloys that provide for compatible fusion with the chosen membrane material or alloy during welding may be used.

In this embodiment, the slotted permeate plate 22 is a steel plate having a plurality of slots 56 extending radially and outwardly from a central opening 58 in the direction of the periphery of the slotted permeate plate 22. The number of slots 56 in a slotted permeate plate 22 may range from approximately 10 to 72. However, other suitable slot densities could conceivably be employed. The permeate plate rim 24 is a substantially flat ring member having a centrally disposed opening 63 and an inner diameter larger than the outer diameter of the slotted permeate plate 22. The permeate plate rim 24 is made from Monel 400 (UNS N 04400); however, other materials can also be used such as nickel, copper, nickel alloys, copper alloys, precious metals or alloys or other alloys that provide for compatible fusion with the chosen membrane material or alloy during welding.

Figure 4:
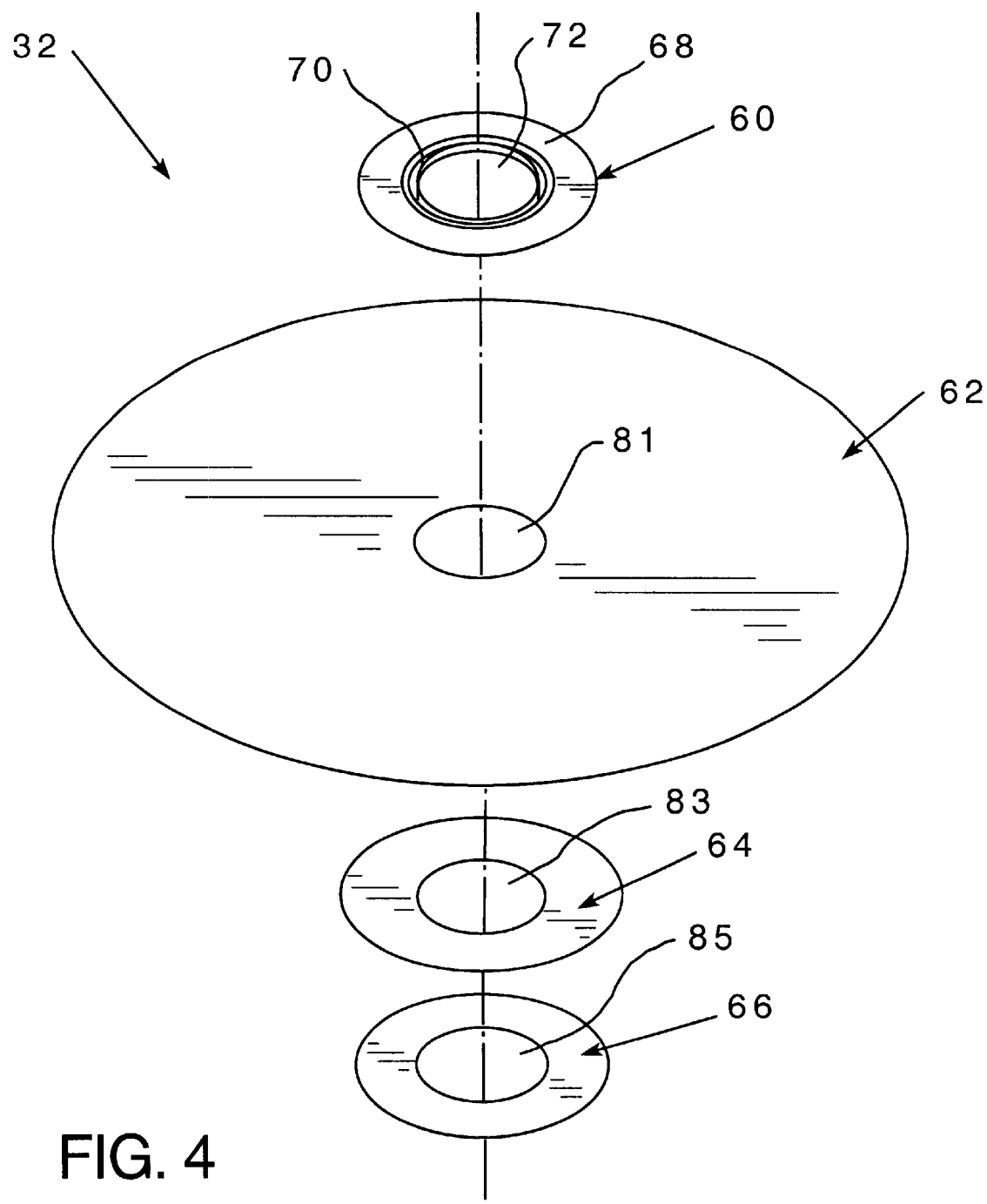
FIG. 4 is an exploded isometric view of the male permeable membrane subassembly of the present invention shown in FIG. 1.

FIG. 4 is an exploded view of the male permeable membrane subassembly 32. The male membrane subassembly 32 comprises a male gasket seat 60, a hydrogen permeable membrane 62, an inner diameter membrane gasket 64, and a center support washer 66. The hydrogen permeable membranes 38 and 62 may be made from at least one hydrogen permeable metal or an alloy containing at least one hydrogen permeable metal, preferably selected from the transition metals of groups VIIB or VIII of the Periodic Table. The hydrogen permeable membrane 62, the inner diameter membrane gasket 64, and the center support washer 66 are similar in structure to the hydrogen permeable membrane 38, the inner diameter membrane gasket 40 and the center support washer 42, respectively, discussed above. The male gasket seat 60 is a substantially planar ring member 68 having a circular protuberance 70 extending around a centrally disposed opening 72. In this embodiment, the female gasket seat 36 and the male gasket seat 60 are made of a high strength alloy material that is compatible with the weld such as Monel 400. The inner diameter member gaskets 40 and 64 are made from the same materials as the first and second outer diameter membrane gaskets 16 and 30, discussed above.

Figure 5:
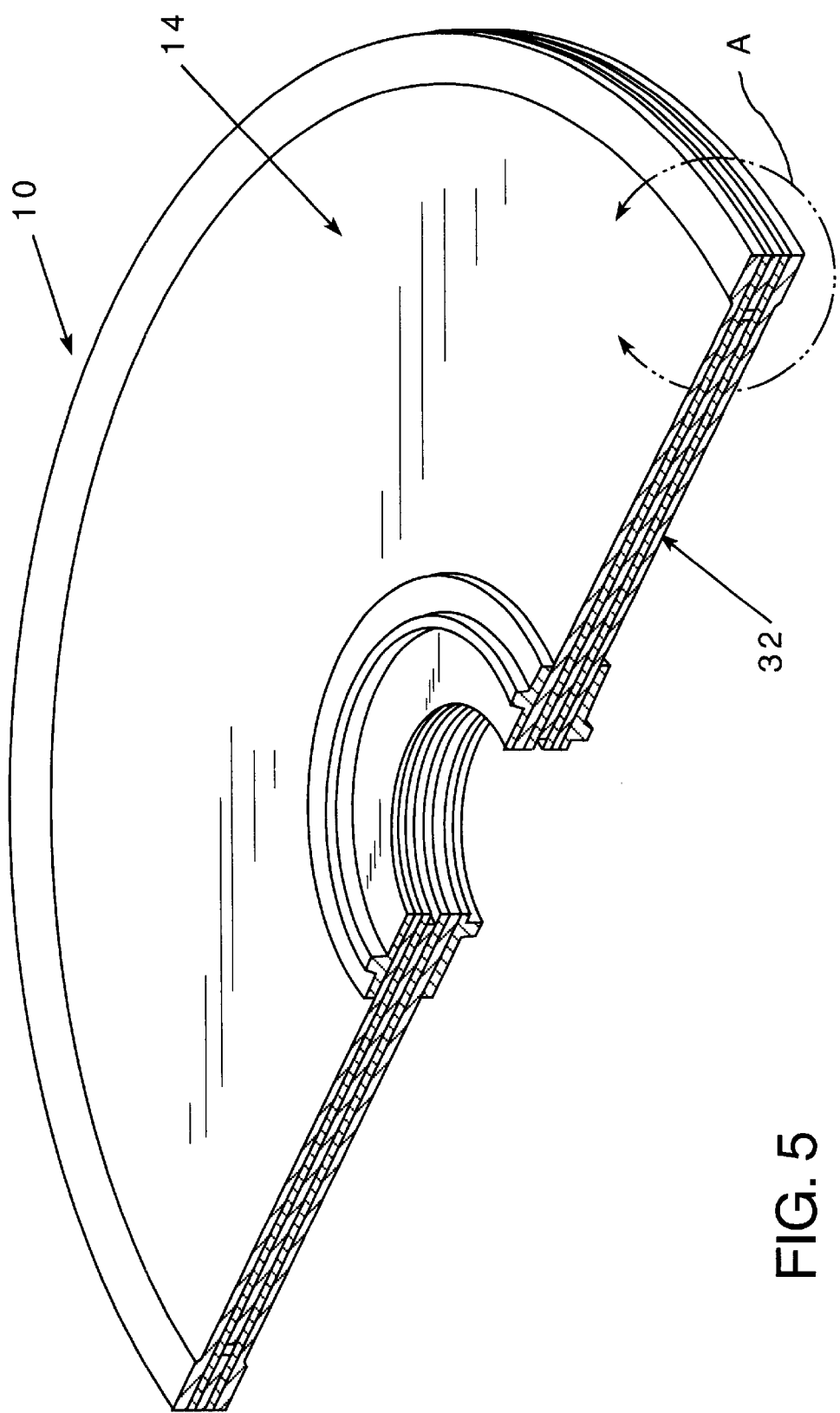
FIG. 5 is a sectional isometric view of the fluid separation assembly of the present invention.
Figure 6:
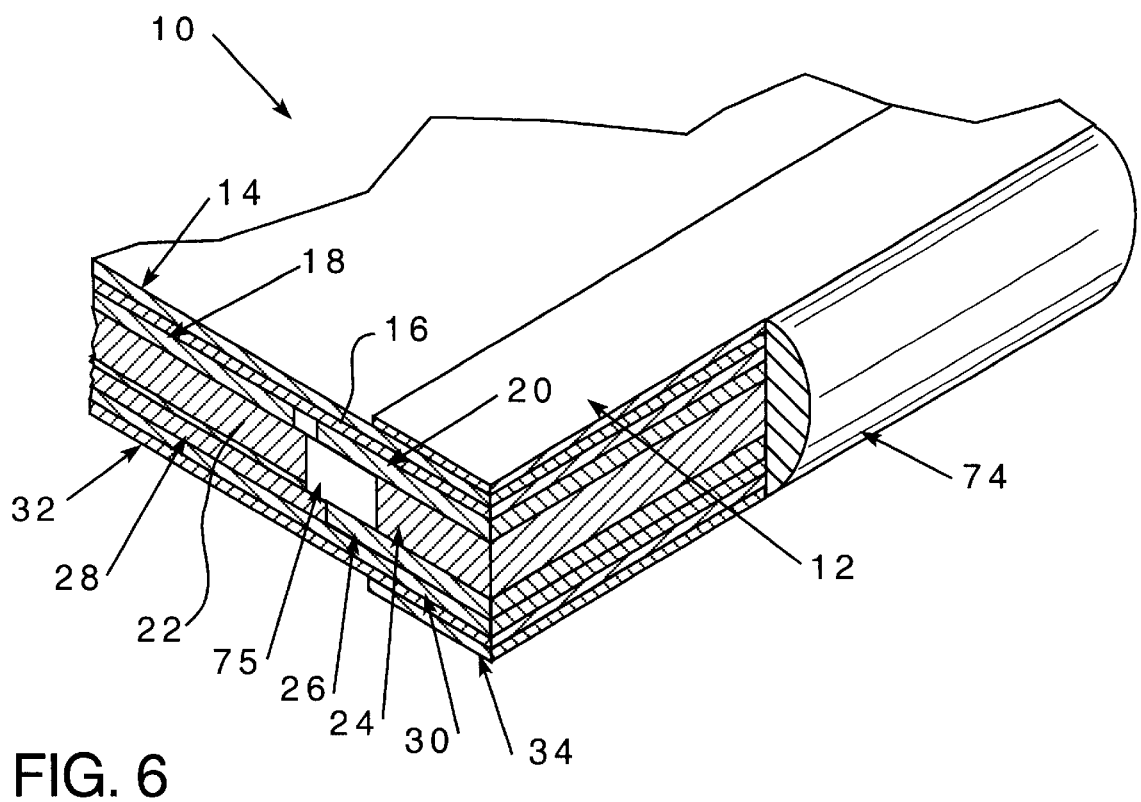
FIG. 6 is an enlarged view of section A of the fluid separation assembly shown in FIG. 5.
Figure 7:
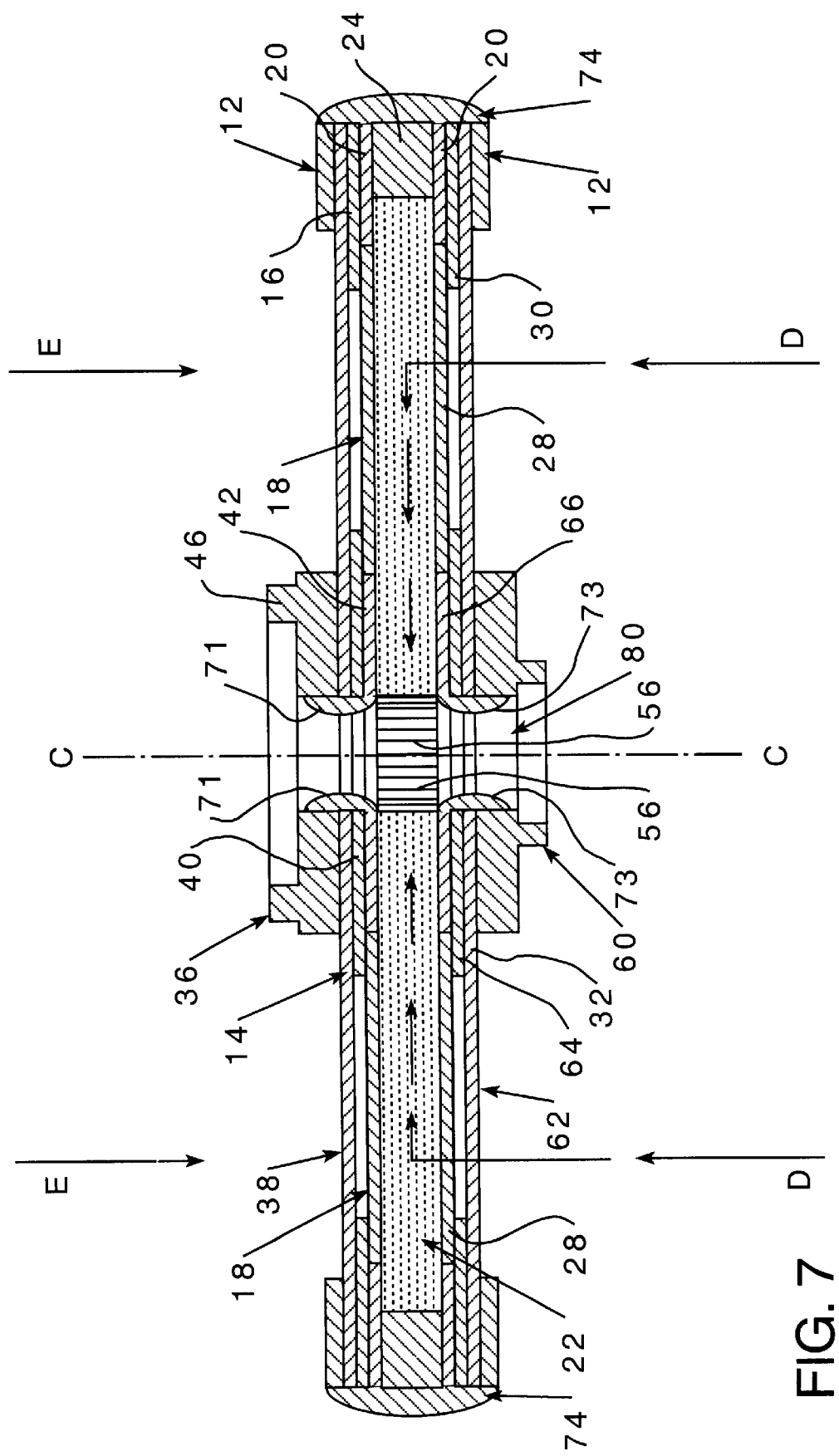
FIG. 7 is a cross-sectional view of the fluid separation assembly of the present invention shown in FIG. 1 taken along line 7—7.

FIGS. 5 through 7 are various cross-sectional views of the assembled fluid separation assembly 10 of the present invention, wherein FIG. 6 is an enlarged view of section A of the fluid separation assembly 10 shown in FIG. 5, and FIG. 7 is a cross-sectional plan view of the assembled fluid separation assembly 10. When assembling the components of the fluid separation assembly 10 shown in FIGS. 2–4, the female membrane subassembly 14 and the male membrane subassembly 32 are initially assembled. The female gasket seat 36, the permeable membrane 38, the inner diameter membrane gasket 40 and the center support washer 42 are placed adjacent one another, as shown in FIG. 7, such that their central disposed openings 45, 50, 51 and 53, respectively, are coaxially aligned. A first weld 71, shown in FIG. 7, is placed at the openings thereof. The first weld 71 takes the form of a weld bead creating a hermetic seal between the female gasket seat 36, the permeable membrane 38, the inner diameter membrane gasket 40 and the center support washer 42. The weld 71 can be effected by a number of commercially available technologies, including but not limited to, lasers, electron beam and tungsten inert gas (TIG) welding. Alternative joining technologies such as brazing or soldering may also be employed with the desired result being a gas tight bond between the gasket seat 36 and the permeable membrane 38. Likewise, the components of the male membrane subassembly 32, which include the male gasket seat 60, the permeable membrane 62, the inner diameter membrane gasket 64 and the center support washer 66 are also placed adjacent one another, as shown in FIG. 7, such that their centrally disposed openings 72, 81, 83 and 85 are coaxially aligned with each other and a second weld bead 73, shown in FIG. 7, is placed around the circumference of the openings 72, 81, 83 and 85 thereof. As stated above, the weld 73 can be effected by a number of commercially available technologies, including but not limited to, laser, electron beam, and tungsten inert gas (TIG) welding.

After the components of the female membrane subassembly 14 and the components of the male membrane subassembly 32 have each been connected by the welds 71 and 73, respectively, they are assembled with the other components described above to form the fluid separation assembly 10. As shown in FIG. 2, the first and second retainer members 12 and 20, the female and male membrane subassemblies 14 and 32, the first and second outer diameter gaskets 16 and 30, the first and second wire mesh membrane supports 18 and 28, the slotted permeate plate 22 and the permeate rim 24 are aligned such that their centrally disposed openings are coaxially aligned. As shown in FIG. 7, these components are retained in that configuration by placing a weld 74 at the outer periphery of the first and second retainer members 12 and 20, the female and male membrane subassemblies 14 and 32, the first and second outer diameter membrane gaskets 16 and 30, and the slotted permeate rim 24. Alternatively, these parts could be assembled such that their centrally disposed openings are coaxially aligned, as shown in FIG. 7, and connected to one another by performing a brazing or soldering operation at the outer periphery of the first and second retainer members 12 and 20, the female and male membrane subassemblies 14 and 32, the first and second outer diameter membrane gaskets 16 and 30 and the slotted permeate rim 24. As seen in FIG. 6, a space 75 is provided between the slotted permeate plate 22 and the permeate rim 24 which permits expansion and contraction of the components of the fluid separation assembly 10 resulting from the change in temperature. Assembled, the fluid separation assembly 10 may have a thickness ranging from 0.010 inches to 0.125 inches, depending upon the thicknesses of the components employed.

When separating the hydrogen from a mixture of gas that includes hydrogen, the gas mixture is directed towards the permeable membranes 38 and 62 of the female membrane subassembly 14 and the male membrane subassembly 32, respectively, in the directions D and E, as shown in FIG. 7. For clarity, the permeable membranes 38 and 62 of the female and male membrane subassemblies 14 and 32, respectively are shown in FIG. 7 as being spaced from the first and second wire mesh membrane supports 18 and 28; however, in use, the permeable membranes 38 and 62 are in contact with the first and second wire mesh membrane supports 18 and 28 and are supported thereby. When the gas mixture containing hydrogen contacts the hydrogen permeable membranes 38 and 62, the hydrogen permeates through the permeable membranes 38 and 62, passes through the first and second wire mesh membrane supports 18 and 28 and enters the slotted permeate plate 22 where the hydrogen enters a specific slot 56 and to be directed toward the central axis C by the passageways formed by the slots 56. The central openings of the components of the fluid separation assembly 10, shown in FIG. 2, form a conduit 80 wherein the purified hydrogen is collected and transported to a desired location. The conduit 80 may have a diameter of between approximately 0.25 inches and 1 inch. The diameter is determined by the components of the fluid separation assembly 10 and by the desire that the hydrogen flow be substantially unimpeded. The non-hydrogen gases in the gas mixture are prevented from entering the fluid separation assembly 10 by the fluid permeable membranes 38 and 62. The remainder of the hydrogen depleted gas mixture is directed around the exterior of the fluid separation assembly 10 in this embodiment.

Figure 8:
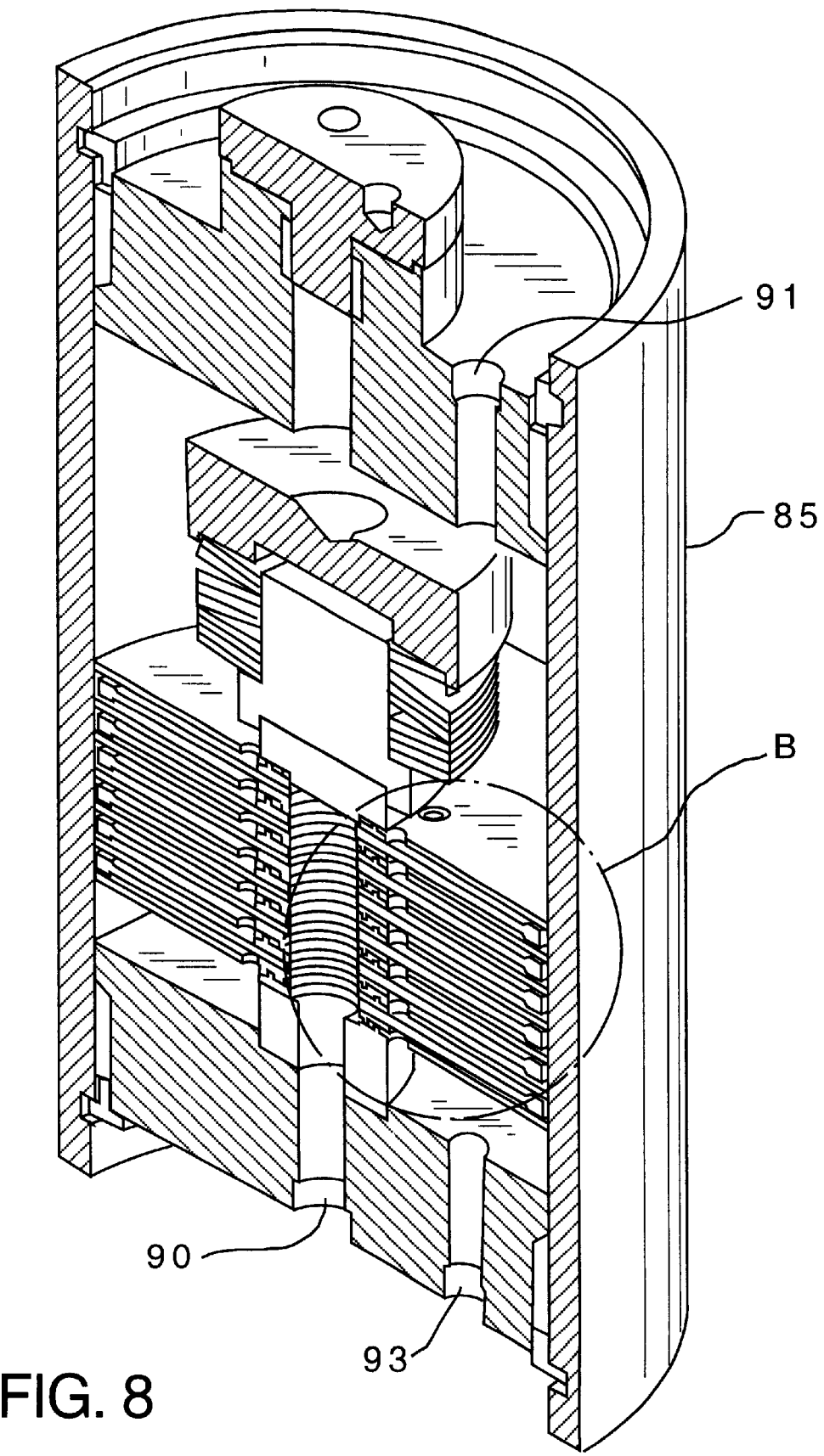
FIG. 8 is an isometric sectional diagrammatical view of a module employing several fluid separation assemblies of the present invention.
Figure 9:
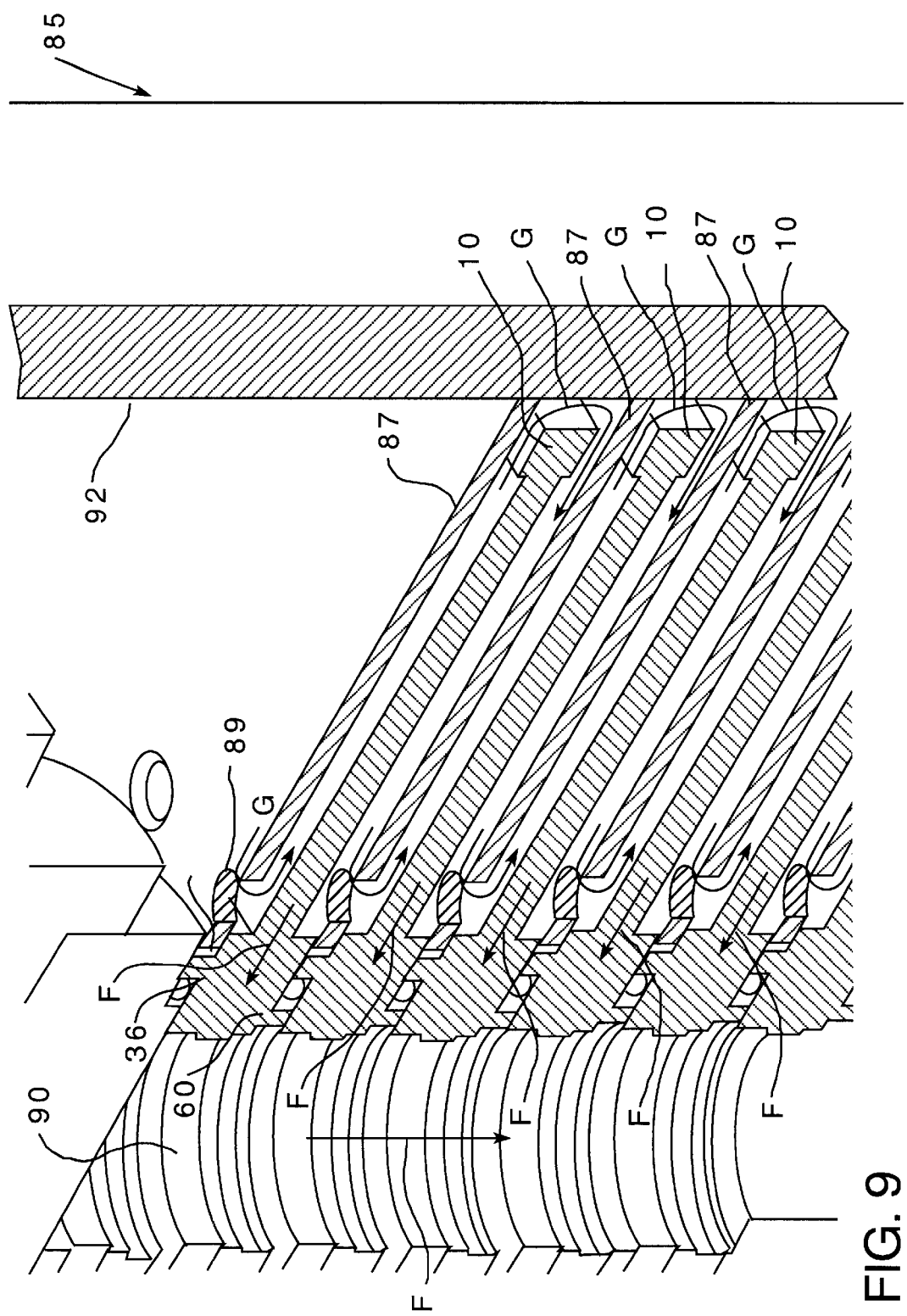
FIG. 9 is an enlarged section B of the module shown in FIG. 8.

FIGS. 8 and 9 illustrate a module 85 employing several fluid separation assemblies 10 of the present invention, wherein FIG. 9 is an enlarged section B of the module 85. Each of the fluid separation assemblies 10 are shown as a solid body for clarity. However, each of the fluid separation assemblies 10 are the same as the fluid separation assemblies 10 shown in FIGS. 1–7. The module 85 has a feed gas inlet 91, a permeate outlet 90 and a discharge gas outlet 93. The fluid separation assemblies 10 are coaxially aligned. Distribution plates 87 are sandwiched between and separate the fluid separation assemblies 10. The distribution plates 87 are positioned on a shoulder of the gasket seats 36 in such a manner that they are positioned equidistant from the planar surface of the permeable membrane assemblies 14 and 32 in successive fluid separation assemblies 10. The distribution plates 87 are not fixedly connected to the gasket seats 36 and 60, but rather rest on a shoulder of the gasket seat 36. There is sufficient clearance between the central opening of the redistribution plate 87 and the shoulder on the female gasket seat 36 that the redistribution plates 87 and the fluid separation assemblies 10 are allowed to position themselves inside the wall of the membrane housing independently of the position of the fluid separation assemblies 10. Each distribution plate 87 has openings 89 therein. The fluid separation assemblies 10 are aligned one with the other such that each of the conduits 80 of the fluid separation assemblies 10 form a larger conduit 90. The path of the gas mixture containing hydrogen, represented by arrow G, enters the opening 89 and travels along the outer surface of the fluid separation assembly 10, wherein some of the hydrogen of the gas mixture is free to enter the fluid separation assembly 10 by the permeable membranes 38 and 62 and is directed along path F into the larger conduit 90 and the remaining gas mixture follows arrow G and serpentines through the passageway, formed by the distribution plates 87, the fluid separation assemblies 10 and the interior wall 92 of the module 85. As the gas mixture travels through the passageway, it contacts the outer surfaces of several other fluid separation assemblies 10, wherein more of the hydrogen remaining in the gas mixture permeates the permeable membranes 38 and 62 and follows the path F resulting in this purified hydrogen entering the larger conduit 90. The remainder of the hydrogen depleted gas mixture exits through a port 93 located at the opposite end of the module 85 after flowing over the entire stack of fluid separation membrane assemblies 10.

Although the present invention has been described in conjunction with the above described embodiments thereof, it is expected that many modifications and variations will be developed. This disclosure and the following claims are intended to cover all such modifications and variations.

What is claimed is:

1. A fluid purification module, comprising a housing and one or more fluid separation assemblies within said housing, each of said one or more fluid separation assemblies comprising:
   (a) a first fluid permeable membrane having a first side and a second side;
   (b) a second fluid permeable membrane having a first side and a second side, wherein said first fluid permeable membrane and said second fluid permeable membrane are spaced apart from each other with their respective second sides opposed and defining a passageway extending therebetween; and
   (c) a support between said first and second fluid permeable membranes, comprising first and second wire mesh membrane supports each having a first surface adjacent to said first and second fluid permeable membranes, respectively, and at least said first surfaces of said wire mesh membrane supports having a coating that is an intermetallic diffusion bonding barrier.

2. The fluid purification module of claim 1, said fluid separation assemblies further comprising a permeate member between said wire mesh membrane supports, said permeate member having a first surface, a second surface, a fluid outlet and fluid passageways extending from said first surface and said second surface to said fluid outlet.

3. The fluid purification module of claim 2, wherein said permeate member is a permeate plate.

4. The fluid purification module of claim 3, wherein said permeate plate is slotted.

5. The fluid purification module of claim 3, wherein said module comprises a plurality of said fluid separation assemblies.

6. The fluid purification module of claim 1, wherein said fluid permeable membranes are hydrogen permeable membranes.

7. The fluid purification module of claim 6, wherein said first and second hydrogen permeable membranes comprise palladium.

8. The fluid purification module of claim 6, wherein said first and second wire mesh membrane supports have a mesh count ranging from approximately 19 to 1000 counts per inch.

9. A The fluid purification module of claim 1, wherein said fluid separation assemblies comprise a centrally located opening.

10. The fluid purification module of claim 1, wherein said first and second fluid permeable membranes are substantially planar.

11. The fluid purification module of claim 1, wherein said intermetallic diffusion bonding barrier comprises a thin film containing a compound selected from the group consisting of oxides, borides, silicides, aluminides and nitrides.

12. The fluid purification module of claim 1, wherein said first and second wire mesh membrane supports are stainless steel.

13. A fluid separation assembly, comprising:
   (a) a first fluid permeable membrane having a first side and a second side;

(b) a second fluid permeable membrane having a first side and a second wherein said first fluid permeable membrane and said second fluid permeable membrane are spaced apart from each other with their respective second sides opposed and defining a passageway extending therebetween; and (c) a support between said first and second fluid permeable membranes, comprising first and second wire mesh membrane supports each having a first surface adjacent to said second sides of said first and second fluid permeable membranes, respectively, and at least the first surfaces of said first and second wire mesh membrane supports having a coating that is an intermetallic diffusion bonding barrier.

14. The fluid separation assembly of claim 13, said fluid separation assembly further comprising a permeate member between said first and second wire mesh membrane supports, said permeate member having a first surface, a second surface, a fluid outlet and fluid passageways extending from said first surface and said second surface to said fluid outlet.

15. The fluid separation assembly of claim 14, wherein said permeate member is a permeate plate.

16. The fluid separation assembly of claim 15, wherein said permeate plate is slotted.

17. The fluid separation assembly of claim 13, wherein said fluid permeable membranes are hydrogen permeable membranes.

18. The fluid separation assembly of claim 17, wherein said hydrogen permeable membranes comprise palladium.

19. The fluid separation assembly of claim 13, wherein said fluid separation assembly comprises a centrally located opening.

20. The fluid separation assembly of claim 13, wherein said fluid permeable membranes are substantially planar.

21. The fluid separation assembly of claim 13, wherein said intermetallic diffusion bonding barrier comprises a thin film containing a compound selected from the group consisting of oxides, borides, silicides, aluminides and nitrides.

22. The fluid separation assembly of claim 13, wherein said wire mesh membrane supports are stainless steel.

23. The fluid separation assembly of claim 13, wherein said first and second wire mesh membrane supports have a mesh count ranging from approximately 19 to 1000 counts per inch.

24. A fluid purification module, comprising:
(a) a housing comprising having a feed gas inlet, a permeate outlet and a discharge gas outlet; and
(b) one or more fluid separation assemblies within said housing, each of said fluid separation assemblies comprising:
  (i) a first fluid permeable membrane having a first side and a second side;
  (ii) a second fluid permeable membrane having a first side and a second side, wherein said first fluid permeable membrane and said second fluid permeable membrane are spaced apart from each other with their respective second sides opposed and defining a passageway extending therebetween, wherein said second sides of said first and second fluid permeable membranes are in communication with said permeate outlet and said first sides of the first and second fluid permeable membranes are in communication with both said feed gas inlet and said discharge gas outlet; and
  (iii) a support between said first and second fluid permeable membranes comprising first and second wire mesh membrane supports each having a first surface and a second surface, said first surfaces of said first and second wire mesh membrane supports adjacent to said second sides of said first and second fluid permeable membranes, respectively, said second surfaces of said wire mesh membrane supports being opposed, and at least the first surfaces of said first and second wire mesh membrane supports having a coating that is an intermetallic diffusion bonding barrier.

25. A hydrogen purification module, comprising:
(a) a plurality of fluid separation assemblies, each assembly comprising:
  (i) a support comprising a first and a second wire mesh membrane support each of said wire mesh membrane supports having a first and second surface, said second surfaces of said first and second wire mesh membrane supports being opposed and at least said first surfaces of said first and second wire mesh membrane supports having a coating that is an intermetallic diffusion bonding barrier;
  (ii) a first hydrogen permeable membrane having a first side and a second side, said second side of said first hydrogen permeable membrane adjacent to said first surface of said first wire mesh membrane support; and
  (iii) a second hydrogen permeable membrane having a first side and a second side, said second side of said second hydrogen permeable membrane adjacent to said first surface of said second wire mesh membrane support;
(b) a feed gas inlet in communication with said first sides of said first and second hydrogen permeable membranes;
(c) a permeate outlet in communication with said second sides of said first and second hydrogen permeable membranes; and
(d) a discharge gas outlet in communication with said feed gas inlet.

26. A hydrogen-selective membrane assembly, comprising:
(a) a first hydrogen permeable membrane having a first side and a second side;
(b) a second hydrogen permeable membrane having a first side and a second side, wherein said first and second hydrogen permeable membranes are spaced apart from each other with their respective second sides opposed and defining a passageway extending therebetween; and
(c) a support within said passageway comprising a first and a second wire mesh membrane support each having a first surface and a second surface, said first surfaces of said first and second wire mesh membrane supports adjacent to said second sides of said first and second hydrogen permeable membranes, respectively.

27. A fluid purification module, comprising:
(a) a feed gas inlet adapted to receive a hydrogen-containing gas mixture;
(b) a permeate outlet through which purified hydrogen is removed from said module;
(c) a discharge gas outlet through which a hydrogen depleted gas mixture is removed from said module; and
(d) a plurality of fluid separation assemblies, each assembly comprising:
  (i) a first hydrogen permeable membrane having a first side and a second side;

(ii) a second hydrogen permeable membrane having a first side and a second side, wherein said first hydrogen permeable membrane and said second hydrogen permeable membrane are spaced apart from each other with their respective second sides opposed and defining a passageway extending therebetween, wherein said second sides of the hydrogen permeable membranes are in communication with said permeate outlet and said first sides of said first and second membranes are in communication with both said feed gas inlet and said discharge gas outlet; and (iii) a support between said first and second hydrogen permeable membranes, comprising a plurality of wire mesh membrane supports adapted to support said hydrogen permeable membranes, each of said plurality of wire mesh membrane supports having a first surface for contacting said first and second hydrogen permeable membranes, at least said first surfaces of said wire mesh membrane supports having a coating that is an intermetallic diffusion bonding barrier.

28. A hydrogen-selective membrane assembly, comprising:

(a) a first hydrogen permeable membrane having a first side and a second side;

(b) a second hydrogen permeable membrane having a first side and a second side, wherein said first and second hydrogen permeable membranes are spaced apart from each other with their respective second sides opposed and defining a passageway extending therebetween; and (c) a support within said passageway having a first surface adjacent said second side of said first hydrogen permeable membrane and a second surface adjacent said second side of said second hydrogen permeable membrane, said first and second surfaces of said support comprising wire mesh and having a coating of an intermetallic diffusion bonding barrier.

* * * * *

UNITED STATES PATENT AND TRADEMARK OFFICE
CERTIFICATE OF CORRECTION

PATENT NO.     : 6,582,499 B2
DATED          : June 24, 2003
INVENTOR(S)    : Frost et al.

It is certified that error appears in the above-identified patent and that said Letters Patent is hereby corrected as shown below:

<u>Title page,</u>
Item [63], Related U.S. Application Data, delete "abandoned." and insert
-- U.S. Pat. No. 6,602,325. -- therefor.

Signed and Sealed this

Twenty-fifth Day of November, 2003

JAMES E. ROGAN
*Director of the United States Patent and Trademark Office*